ELECTRIC CIRCUIT ARRANGEMENT

Filed Oct. 1, 1962

INVENTOR
John L. Cox 2nd
BY
his attorney

United States Patent Office 3,191,005

Patented June 22, 1965

3,191,005

ELECTRIC CIRCUIT ARRANGEMENT

John L. Cox 2nd, 17 Westorchard Road, Chappaqua, N.Y.

Filed Oct. 1, 1962, Ser. No. 227,248
16 Claims. (Cl. 219—528)

The present invention relates to a conductor or conductors suitable, for instance, for making connections between electrical components or as resistance, for instance, for use as a heating element, to an arrangement incorporating the same and to a method of producing such arrangement.

For several important applications it is necessary to have conductors or resistance wires arranged in a predetermined pattern so as to permit subsequent connection between electrical components, or to serve as resistance so as to achieve, for instance, the desired heating effect on a body contacted by such resistance wires or incorporating the same.

It has been proposed for this purpose to adhere coated conductors, for instance resistance wires, to cloth so that the resistance wire will extend over the cloth in a predetermined pattern. The thus formed electrical circuit arrangement which consists essentially of cloth with the coated wire attached thereto may then be embedded, for instance, in a body of plastic material. Embedment may be accomplished by bag molding or by placing the cloth with the wire thereon into a mold and then filling the mold with synthetic plastic material adapted to be molded, so that the arrangement will be embedded in the molded body, whereby the cloth will serve not only to maintain the predetermined pattern of the electrical conductor but also to reinforce the molded body.

However, considerable difficulties are encountered in attaching wire to a cloth support so as to obtain the desired firm adherence of the wire forming the predetermined pattern on the glass cloth, and preventing damage to any insulating material covering of the wire.

Furthermore, the danger exists that any relatively fine wire will break and thus cause interruption of the current flow, when the plastic body in which the wire and its cloth support are embedded is subjected to mechanical force such as impacts and the like. Such force when conveyed through the plastic body directly to the wire or to an insulating covering of the wire which firmly adheres to the wire, may cause breaking of the wire.

It is therefore an object of the present invention to overcome the above discussed and other difficulties and disadvantages.

It is another object of the present invention to provide an insulated conductor which will not be subject to the above mentioned difficulties and which can be produced in a simple and economical manner.

According to a preferred embodiment of the present invention, improved reliability is obtained by using a non-adhering coating over the conductor. This feature of my invention may be achieved whether the conductor thus protected is subsequently held in place by methods elsewhere described herein or is attached to supporting cloth by an other means such as sewing, or indeed no matter how it may be positioned during the construction of a plastic body incorporating a conductor thus protected.

Further objects of the present invention include the provision of an arrangement comprising such insulated conductor adhering in a predetermined pattern to a support, which arrangement may be produced in a particularly simple and economical manner.

Other objects and advantages of the present invention will become apparent from a further reading of the description and of the appended claims.

With the above and other objects in view, the present invention contemplates an insulated electric conductor, comprising, in combination, an elongated metallic conductor which may be a single wire or a stranded conductor formed of a plurality of wires, an inner surrounding insulating layer contacting the elongated metallic conductor and consisting of synthetic plastic material having a predetermined softening point, and an outer insulating layer of synthetic plastic material having a softening point lower than the predetermined softening point of the inner layer, and adapted to become actively adhesive at an elevated temperature below the predetermined softening point.

The present invention also includes an electric conductor arrangement, comprising, in combination, a polyamide, i.e. nylon, coated, open mesh glass cloth, and an insulated electric conductor comprising a nylon-coated metal wire arranged on at least one face of the glass cloth in a predetermined pattern, the nylon coatings of the glass cloth and of the insulated conductor being fused to each other so as to hold the conductor in the predetermined pattern on the glass cloth.

The coated conductor may be adhered to one face of the cloth, or may be pulled through the same and adhered to both faces, or separate circuits may be adhered to one or both faces of the cloth.

The present invention is also concerned with a body of predetermined shape consisting essentially of a solid synthetic plastic material having embedded therein an electric conductor, for instance an electric resistance heating arrangement, which comprises an open mesh glass cloth, and an insulated electric conductor adhering to at least one face of the glass cloth in a predetermined pattern, the conductor comprising a metal wire, an inner layer formed of polytetrafluoroethylene, surrounding the metal wire, and an outer layer surrounding the inner layer of polytetrafluoroethylene having a softening point and adapted to become actively adhesive at an elevated temperature below the softening point of the polytetrafluoroethylene and also adapted to adhere to contacting portions of the glass cloth, the outer layer consisting of a fluorinated ethylenepropylene resin.

According to the present invention, an electric heating arrangement may be produced by arranging about spaced pins extending outwardly from a support an insulated electric conductor consisting essentially of a metal wire which may be single or stranded, with, or in certain cases without, an inner surrounding insulating layer contacting the metal wire and formed of synthetic plastic material having a predetermined softening point, and of an outer layer of a different synthetic plastic material adapted to become actively adhesive at an elevated temperature below the predetermined softening point of the inner insulating layer if any, so as to cause by arranging the conductor about the pins that the conductor will assume a shape corresponding to a predetermined pattern, superposing upon the conductor a glass cloth adapted to adhere to the conductor upon application of pressure at the elevated temperature, the superposed glass cloth being held by the upwardly extending pins passing through the glass cloth, applying heat at the elevated temperature and pressure to the glass cloth in the direction towards the coated conductor so as to adhere the glass cloth and the conductor to each other, and removing the thus formed electric heating arrangement consisting essentially of the glass cloth with the coated conductor adhering thereto in the predetermined pattern.

It is also possible to arrange the glass cloth below the insulated conductor forming the predetermined pattern, and to apply heat from below and pressure from above for joining glass cloth and insulated conductor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

It is again noted that, while the invention is described primarily in connection with an electric heating arrangement, it is not limited thereto, but also encompasses other types of electric circuits and the like.

Figure 1:
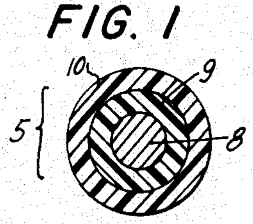
FIG. 1 is a cross sectional view of an insulated electric conductor according to the present invention.

Referring now to the drawing, and particularly to FIG. 1, the coated electric conductor 5 is shown to comprise metal wire 8 surrounded by two superposed plastic layers 9 and 10.

Figure 6:
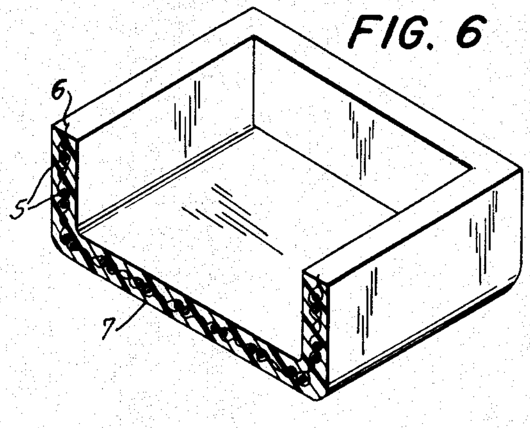
FIG. 6 is a perspective view partially in cross section of a box-shaped plastic body having a heating arrangement according to the present invention embedded therein.

The wire, for instance, may consist of copper, copper alloys or nickel-iron-chromium alloys, for instance the alloy commercially available under the trade name "Nichrome," and preferably will have a diameter of between 0.002 and 0.025 inch, most preferably about 0.005 inch. Wires having a smaller diameter than 0.002 inch generally have been found to be too weak and too easily subject to breakage while, on the other hand, wires having diameters larger than 0.025 inch usually are too stiff for the intended purpose and upon thermal expansion or contraction may develop undesirable forces which may tend to cause cracks in a surrounding plastic body, for instance, such as shown in FIG. 6. Of course, the wire may also be formed of other metals and alloys. The preferred maximum and minimum diameters of the wire will depend considerably on the final intended use and to some extent on the mechanical and electric properties of the respective metal or alloy of which the wire is formed.

As illustrated in FIG. 1, the wire is surrounded by two superposed layers of plastic material. As will be described further below, under certain circumstances, it is also possible to form the electric circuit arrangement of the present invention with only a single synthetic plastic layer surrounding the wire. However, in most cases, as illustrated in FIG. 1, two plastic coatings will surround the wire, of which the inner plastic layer will have a relatively high softening point which usually should be higher than the temperature to which the wire may be heated by passage of an electric current therethrough, and which also must be higher than the temperature at which the outer plastic layer will become actively adhesive.

According to one preferred embodiment, outer layer 10 is formed of cellulose acetate which softens and becomes actively adhesive at a temperature in the range of between about 400° F. and 500° F. Other synthetic plastic materials of which outer layer 10 may be formed include polyethylene, polypropylene, polyamides (including nylon), cellulose acetate butyrate, and polymers of vinyl acetate, vinyl alcohol, vinyl butyral, vinyl chloride, vinylidene chloride, and others.

The inner plastic layer 9 which is interposed between the wire 8 and outer layer 10 will consist of a plastic material having a higher melting point, preferably of Teflon, i.e. either polytetrafluoroethylene or a fluorinated ethylene-propylene resin (TFE or FEP), or Kel-F, i.e., polychlorotrifluoroethylene. Other synthetic plastic materials having a sufficiently high softening point may also be used for forming inner layer 9.

It is a particular advantage of using polytetrafluoroethylene as the material of inner layer 9 that wire 8 will not adhere to the polytetrafluoroethylene, and that also this inner layer 9 may slip on outer layer 10. Thus, at least to a limited extent relative movement between wire 8 and outer layer 10 will be possible and this in many cases will prevent breaks in the wire which might otherwise occur when a plastic body or the like having the insulated conductor of the present invention embedded therein is subjected to mechanical stress or impact. For instance, if a resistance wire is embedded in a plastic body in such manner that it cannot slip within the said body (such as cases for housing rockets and various other types of equipment subject to rough handling, helicopter rotor blades and engine air inlets, spinners of the propellers of a turbo-prop aircraft and other external aircraft surfaces) impacts to which the plastic body is exposed will be transmitted to the conductor. In this manner, too, any crazing which takes place in the plastic body may result in conductor failure without the protection provided by my invention. However, inclusion of a sheath such as layer 9 providing a degree of slip for the conductors minimizes the effect of impacts or crazing and of any other source of stress such as heating and cooling of the conductor. While any relatively non-adherent material including such plastics as fluorinated ethylene-propylene polymer, polyethylene, polyvinyl chloride, or polychlorotrifluoroethylene may be used, polytetrafluoroethylene has been found a preferred material because of its high temperature resistance, excellent anti-adhesion properties and uniquely low coefficient of friction.

Layers 9 and 10 may be applied to wire 8 in any desired manner, for instance by extrusion, or by repeated dipping into solutions or emulsions of the respective plastic material, by winding a strip of the plastic material about wire 8 or about previously applied layer 9, which wound strip may then be heated to its fusing or melting temperature, or by winding or braiding filaments.

The thickness of each of layers 9 and 10, preferably will be between 0.001 and 0.010 inch.

Good results are obtained with wires 8 surrounded by an inner layer 9 which consists of one of the fluorinated ethylene or ethylene-propylene polymers, and an outer layer 10 formed of cellulose acetate, cellulose butyrate or nylon.

It may sometimes be preferred, particularly for high temperature applications, to form inner layer 9 of polytetrafluoroethylene (having a particularly high softening point) and outer layer 10 of fluorinated ethylene-propylene resin (having a softening point which is lower than that of polytetrafluoroethylene).

Figure 5:
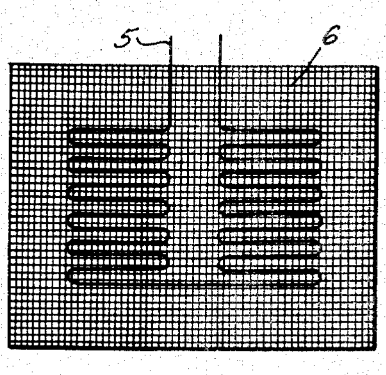
FIG. 5 is a plan view of an electric resistance or heating arrangement according to the present invention.

As illustrated in FIG. 5, the coated electric conductor 5 is fixed in a predetermined pattern onto supporting cloth 6.

The supporting cloth 6 may be made of any material of suitable strength, and having a sufficiently high melting point, for example cloth made of glass, quartz, asbestos, carbon, "Pluton" (a special fabric produced by Minnesota Mining and Manufacturing Company), or, in some cases organic fibres. Adhesion of the coating 10 to the cloth 6, upon application of heat and pressure, may be the result of the adhesive properties of coating 10 alone, may be obtained by the flowing of coating 10 around the fibres of cloth 6, or by treatment of the cloth with the same material used in coating 10, or a different but compatible material, such that heat will cause the adherence of coating 10 to the material with which the cloth is treated. It has been found that glass is an excellent material for the cloth because of its high melting point and high strength and availability. It is therefore the preferred material. It has further been found that a synthetic plastic coating of such materials as cellulose acetate, cellulose acetate butyrate, or nylon on the glass cloth gives excellent results when similar material is also used for the outer coating of the conductor. When glass cloth is treated with such material, it is desirable for many applications to use an open mesh glass cloth, for instance a lino weave glass having 30 ends in the warp and 16 picks per inch in the filling, and an overall thickness of .006 inch. The synthetic plastic coating is so thin that the open mesh structure of the glass cloth remains unimpaired. When such open mesh glass cloth is embedded in a plastic molded body such as illustrated in FIG. 6, the resin can "tooth" through the open mesh, providing a strong over-all structure, even though adhesion of the resin to the conductor and cloth arrangement as illustrated in FIG. 5 may not be good.

When cloth 6 is glass cloth and is to be coated with a thin layer of such synthetic plastic, this may be accomplished by dissolving the synthetic plastic in a suitable solvent therefor known in the art and progressively dipping and drying the glass cloth in the conventional method for treating such materials. It has been found that good results may be obtained by applying about 0.6 lb. of such synthetic plastic to 1 square yard of lino weave glass cloth of the type described above.

When glass cloth is treated with such synthetic materials as cellulose acetate, cellulose acetate butyrate or nylon and the outer layer 10 of conductor 5 consists of a similar, compatible synthetic plastic material, the plastic material on the cloth and the plastic material surrounding the conductor will fuse together under heat and pressure, and thus when cooled will firmly anchor the conductor 5 against the supporting glass cloth 6. If nylon is used, a particularly firm bond is obtained.

Alternatively, the cloth 6 may be woven of for instance glass fibres already coated with such synthetic plastic material, or may be woven of two fibres of differing melting points, for instance of glass and of such synthetic plastic materials in a ratio such as 60% glass fibres to 40% synthetic plastic fibres, to produce a strong material to which a correspondingly coated conductor may be made to adhere by heat and pressure. Such variants are considered to be included in the term "coated" as used elsewhere in this disclosure and in the appended claims, without departing from the intent of this invention. However, when outer layer 10 of conductor 5 consists of Teflon, i.e. of fluorinated ethylene-propylene resin, it is also possible to achieve firm adherence between conductor 5 and a glass cloth 6 which is not coated.

It is also possible, and sometimes desirable, to adhere to an appropriately coated glass cloth (as described further above) a conductor which consists only of a metal wire having a single coating of the same synthetic plastic material thereon. However, in such case the danger exists that upon fusing the plastic coating of the glass cloth to the similar plastic layer of the conductor, the insulation of the latter might be impaired, in other words, it might then happen that portions of the metal wire would become exposed. Furthermore, as explained above, there is less mechanical protection for the conductor than if an intermediate coating is used adjacent the conductor.

Figure 2:
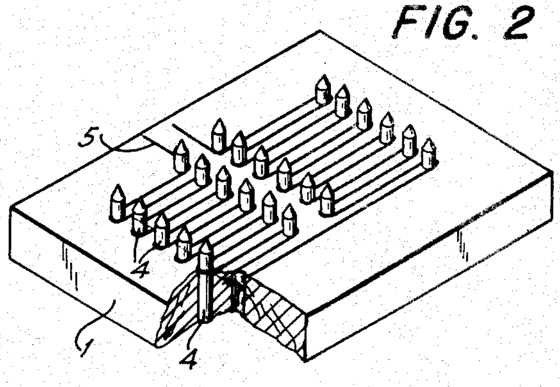
FIG. 2 is a fragmentary perspective view of a device which may be used for forming thereon the electric heating arrangement of the present invention.
Figure 3:
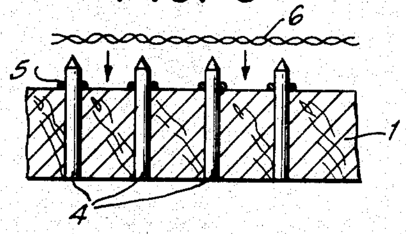
FIGS. 3 and 4 are cross sectional views of the device illustrated in FIG. 2 and of the elements of an electric heating or resistance arrangement of the present invention in different stages of production thereof.
Figure 4:
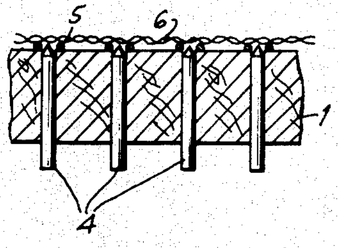

FIGS. 2–4 of the drawing will serve to illustrate a preferred method of producing an electric heating arrangement according to the present invention.

The device illustrated in FIG. 2 comprises a plate or support 1 and a plurality of pins 4 having a length somewhat exceeding the thickness of plate 1. Pins 4 are arranged in a predetermined pattern so as to extend through the entire thickness of plate 1 and outwardly of the upper face thereof.

Coated wire 5 is then wound about pins 4 so as to form the desired predetermined pattern.

As illustrated in FIG. 3, cloth 6 such as described further above, for instance an open mesh glass cloth, is then placed onto the upper face of support 1 so that the tips of pins 4 will extend through cloth 6 and the latter will contact the outer layer of coated conductor 5, for instance a nylon layer or a layer of fluorinated ethylene-propylene resin.

Thereafter a platen is pressed down over the assembly in such manner that the pins are depressed into the position illustrated in FIG. 4, and heat and pressure are applied to cause the outer layer 10 (or the single coating) of conductor 5 to fuse with the coating of (or to adhere to the uncoated) cloth 6.

As soon as all the fused portions have hardened, the thus formed electric circuit arrangement may be withdrawn from support 1.

Pins 4 which now extend outwardly of the lower face of support 1 may then be pushed back from this position as indicated in FIG. 4 to the position indicated in FIG. 3.

It will be understood that variations in the technique of causing the cloth and the conductor to be bonded together, such as providing recesses in the platen that the pins may enter rather than providing means for their being depressed, may be employed.

It will be further understood that the coated conductor can be formed into a predetermined pattern in any of various ways such as layout against a pressure-sensitive adhesive surface, or layout in a grooved surface, or progressively, traverse by traverse, against cloth which is advanced first past the winding position and then through a heat sealing zone.

FIG. 6 illustrates a molded article, for instance of epoxy resin, having incorporated therein an electrical circuit, for instance a resistance heating arrangement 5, 6 produced as described above. Glass cloth 6 will serve not only as support for conductor 5 so that the same will remain arranged according to its predetermined pattern, but also as a reinforcing element for epoxy resin body 7. It is of course possible to embed several electrical circuit arrangements 5, 6 in epoxy resin or the like body 7, and also in addition, it is frequently desirable to incorporate therein other reinforcing elements such as densely woven glass cloth.

The following examples are given as illustrative only of the present invention without, however, limiting the invention to the specific details of the examples.

*Example I*

A 0.015" silver-plated copper conductor is sheathed with 0.003" polytetrafluoroethylene, which in turn is covered with approximately 0.004" of cellulose acetate. Sections of coated wire of appropriate length are cut. For the purpose of attaching terminals, portions of each section are stripped of their coating and "turret" terminals are soldered to the stripped wire portions which are located at the ends of each wire section and, if required, also at intermediate points thereof. Each conductor and terminal assembly is positioned around pins in a predetermined pattern. Cellulose acetate treated lino weave glass cloth is superimposed. Heat and pressure are applied by a platen which is pressed against the pins and the conductor assembled around the same, thus causing the cellulose acetate around the wires and the cellulose acetate coating on the glass cloth to fuse together. When cool again, the arrangement is removed from the pins and embedded in a plastic laminataion. Electrical components may then be attached to the various terminals and thus, because of the predetermined pattern, be duly connected together.

*Example II*

A .012" conductor of "Nichrome"—i.e. a nickel-chromium-iron alloy, is coated first with 0.008" of polytetrafluoroethylene, which is then covered in turn with an outer 0.006" layer of nylon. The conductor so insulated is wound around pins in a predetermined pattern, and super-imposed lino weave glass cloth (30 ends, 16 picks per inch) coated with nylon is pressed against the insulated conductor with a heated platen. After cooling, the arrangement of resistance wire, held in place on the glass cloth by adherence of the two nylon surfaces, is removed from the winding form. Embedded in part of an epoxy Fiberglas box designed to protect delicate military equipment, the conductor of the arrangement thus formed may be used as an electric heater to maintain the temperature of the contained equipment.

*Example III*

A 0.006" nickel-copper alloy wire is encased in a 0.004" sheath of cellulose acetate. The conductor so covered is wound on pins in a predetermined pattern, and adhered to cellulose acetate treated lino weave glass cloth (30 ends, 16 picks per inch) in the manner described above by application of heat and pressure. This arrangement provides a heating element for embodiment in epoxy or polyester laminations where lower levels of electrical insulation and resistance to damage are satisfactory, or where adequate protection is provided by the laminate.

*Example IV*

An electrical conductor consisting of 7 strands of silver-plated copper wire is encased in a sheath of 0.004" polytetrafluoroethylene, which is then covered in turn with an outer 0.003" sheath of nylon. The conductor so insulated is wound around pins in a predetermined pattern and is attached to nylon-coated lino weave glass cloth (30 ends, 16 picks per inch), in the manner described above, by application of heat and pressure. Subsequently embedded in an epoxy Fiberglas partition within a container for delicate instruments, the conductor of the arrangement thus formed may be used as a heating element to maintain the temperature of the instruments.

*Example V*

A 0.010" "Nichrome"—i.e. nickel-chromium-iron alloy wire is sheathed with a 0.005" layer of polytetrafluoroethylene, which is then covered in turn with a 0.005" layer of polyfluorinated ethylene-propylene. The sheathed wire is then wound around pins in a predetermined pattern; lino weave glass cloth is superimposed over the sheathed and thus insulated wire; and heat and pressure are applied by pressing a heated platen against the thus formed assembly so as to cause the outer covering of the wires to flow around the fibres of the glass cloth and thereby anchor the wire in place against the surface of the glass cloth, when once again cool.

This arrangement may be embedded in high-temperature epoxy or other suitable material and then be used as a heater at relatively high temperatures.

Heaters similar to each of those described above have been found useful for cementing directly against objects to be heated. Epoxy, neoprene, thiokol and silicone rubber have all been found suitable for making such attachments.

It will be understood that each of the elements described above, or two or more together, may also find a useful application in other types of insulated conductors differing from the types described above and used for purposes other than resistance heating.

While the invention has been illustrated and described as embodied in an electric conductor, an electric heating arrangement and a method of making the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. An insulated electric conductor, comprising, in combination, a metal wire; an inner imperforate and impervious tubular insulating sheath consisting of a substance selected from the group consisting of polytetrafluoroethylene and fluorinated ethylene-propylene resins entirely enclosing said metal wire; and an outer attaching layer of latently adhesive material having a softening point lower than the softening point of said substance and adapted to become actively adhesive at an elevated temperature below the softening point of said substance, said material being selected from the group consisting of fluorinated ethylene-propylene resins and nylon and surrounding said inner insulating sheath so as to be adapted to serve upon heating as adhesive attachment for said conductor to a support without affecting the insulating properties of said inner tubular insulating sheath.
conductor to a support without affecting the insulating 2. An insulated electric conductor, comprising, in combination, a metal wire; an inner imperforate and impervious tubular insulating sheath consisting of a substance selected from the group consisting of polytetrafluoroethylene and fluorinated ethylene-propylene resins entirely enclosing said metal wire; and an outer attaching layer of latently adhesive thermoplastic material having a softening point lower than the softening point of said substance and adapted to become actively adhesive at an elevated temperature below the softening point of said substance said latently adhesive material consisting essentially of nylon and surrounding said inner insulating sheath so as to be adapted to serve upon heating as adhesive attachment for said conductor to a support without affecting the insulating properties of said inner tubular insulating sheath.

3. An insulated electric conductor, comprising, in combination, a metal wire; an inner imperforate and impervious tubular insulating sheath consisting of polytetrafluoroethylene entirely enclosing said metal wire, said wire being movable relative to said inner sheath; and an outer attaching layer of latently adhesive thermoplastic material having a softening point lower than the softening point of said polytetrafluoroethylene and adapted to become actively adhesive at an elevated temperature below the softening point of said polytetrafluoroethylene, said outer layer consisting essentially of a fluorinated ethylene-propylene resin and surrounding said inner insulating sheath so as to be adapted to serve upon heating as adhesive attachment for said conductor to a support without affecting the insulating properties of said inner tubular insulating sheath.

4. An insulated electric conductor, comprising, in combination, a metal wire; an inner imperforate and impervious tubular insulating sheath consisting of polymerized fluorinated ethylene entirely enclosing said metal wire; and an outer attaching layer of latently adhesive thermoplastic material having a softening point lower than the softening point of said polymerized fluorinated ethylene and adapted to become actively adhesive at an elevated temperature below the softening point of said polymerized fluorinated ethylene, said outer layer being selected from the group consisting of polymers of fluorinated ethylene-propylene and nylon and surrounding said inner insulating sheath so as to be adapted to serve upon heating as adhesive attachment for said conductor to a support without affecting the insulating properties of said inner tubular insulating sheath.

5. An insulated electric conductor, comprising, in combination, a metal wire; an inner imperforate and impervious tubular insulating sheath consisting of polytetrafluoroethylene entirely enclosing said metal wire, said were being movable relative to said inner sheath; and an outer attaching layer of latently adhesive thermoplastic material having a softening point lower than the softening point of said polytetrafluoroethylene and adapted to become actively adhesive at an elevated temperature below the softening point of said polytetrafluoroethylene, said outer layer consisting of nylon and surrounding said inner insulating sheath so as to be adapted to serve upon heating as adhesive attachment for said conductor to a support without affecting the insulating properties of said inner tubular insulating sheath.

6. An electric resistance arrangement, comprising, in combination, a nylon-coated open mesh glass cloth; and an insulated electric conductor comprising a nylon-coated metal wire arranged on one face of said glass cloth in a predetermined pattern, said nylon coatings of said glass cloth and of said insulated conductor being fused to each other so as to hold said conductor in said predetermined pattern on said glass cloth.

7. An electric resistance arrangement, comprising, in combination, a nylon-coated open mesh glass cloth; and an insulated electric conductor comprising a metal wire, an inner imperforate and impervious tubular insulating sheath entirely enclosing said metal wire and consisting of synthetic plastic material having a predetermined softening point, and an outer attaching layer of latently adhesive thermoplastic material having a softening point lower than said predetermined softening point and adapted to become actively adhesive so as to fuse with nylon at an elevated temperature below said predetermined softening point surrounding said inner insulating sheath, said insulated electrical conductor being arranged on one face of said glass cloth in a predetermined pattern, said nylon coating of said glass cloth and said outer latently adhesive layer of said conductor being fused to each other so as to adhere said conductor in said predetermined pattern on said glass cloth without affecting the insulating properties of said inner tubular sheath.

8. An electric resistance arrangement, comprising, in combination, an open mesh glass cloth; and an insulated electric conductor adhering to one face of said glass cloth in a predetermined pattern, said conductor comprising a metal wire, an inner imperforate and impervious tubular insulating sheath consisting of polytetrafluoroethylene entirely enclosing said metal wire, and an outer attaching layer of latently adhesive thermoplastic material having a softening point lower than the softening point of said polytetrafluoroethylene and adapted to become actively adhesive at an elevated temperature below the softening point of said polytetrafluoroethylene adhesively adhering said conductor to contacting portions of said glass cloth, said outer layer consisting of a fluorinated ethylene-propylene resin, whereby said conductor is adhesively adhered to said glass cloth without affecting the insulating properties of said inner tubular insulating sheath, and said metal wire is movable relative to said sheath due to the low coefficient of friction of said polytetrafluoroethylene.

9. An electric circuit arrangement, comprising, in combination, an open mesh glass cloth; and an insulated electric conductor arranged on at least one face of said glass cloth in a predetermined pattern, said conductor comprising a metal wire and an insulating sheath of latently adhesive synthetic plastic material having a low coefficient of friction surrounding and contacing said wire, whereby said metal wire is movable relative to said sheath due to the low coefficient of friction of said synthetic plastic material, said sheath of latently adhesive synthetic plastic material adhesively attaching said conductor in said predetermined pattern to said glass cloth.

10. An electric resistance arrangement, comprising, in combination, an open mesh glass cloth; and an insulated electric conductor adhering to one face of said glass cloth in a predetermined pattern, said conductor comprising a metal wire, an inner imperforate and impervious tubular insulating sheath consisting of polytetrafluoroethylene entirely enclosing said metal wire, and an outer attaching layer of latently adhesive thermoplastic material having a softening point lower than the softening point of said polytetrafluoroethylene and adapted to become actively adhesive at an elevated temperature below the softening point of said polytetrafluoroethylene adhesively adhering said conductor to contacting portions of said glass cloth, said outer layer consisting of nylon, whereby said conductor is adhesively adhered to said glass cloth without affecting the insulating properties of said inner tubular insulating sheath, and said metal wire is movable relative to said sheath due to the low coefficient of friction of said polytetrafluoroethylene.

11. A shaped body consisting essentially of a solid substantially rigid first synthetic plastic material having embedded therein an electric conductor comprising a metal wire and an imperforate and impervious tubular insulating sheath of second synthetic plastic material having a low coefficient of friction which is lower than the coefficient of friction of said solid substantially rigid first synthetic plastic material and surrounding and contacting said wire, whereby said metal wire is movable relative to said sheath due to the low coefficient of friction of said second synthetic plastic material which is lower than the coefficient of friction of said first synthetic plastic material.

12. A shaped body consisting essentially of a solid substantially rigid synthetic plastic material having a higher coefficient of friction than polytetrafluoroethylene and having embedded therein an electric conductor comprising a metal wire and an imperforate and impervious tubular insulating sheath of polytetrafluoroethylene surrounding and contacting said wire, whereby said metal wire is movable relative to said sheath due to the low coefficient of friction of said polytetrafluoroethylene which is lower than the coefficient of friction of said solid substantially rigid synthetic plastic material.

13. A shaped body consisting essentially of a solid synthetic plastic material having embedded therein an electric circuit arrangement as defined in claim 7.

14. A shaped body consisting essentially of a solid epoxy resin body having embedded therein an electric resistance heating arrangement which comprises a nylon-coated open mesh glass cloth; and an insulated electric conductor comprising a nylon-coated metal wire arranged on one face of said glass cloth in a predetermined pattern, said nylon coatings of said glass cloth and of said insulated conductor being fused to each other so as to hold said conductor in said predetermined pattern on said glass cloth in said epoxy resin body.

15. A shaped body consisting essentially of a solid synthetic resin body having embedded therein an electrical circuit arrangement comprising, in combination, open mesh nylon-coated glass cloth; and an insulated electrical conductor adhered thereto in a predetermined pattern, said conductor comprising a metal wire .002″ to .025″ in diameter, an inner imperforate and impervious tubular insulating sheath consisting of polytetrafluoroethylene surrounding said metal wire, and an outer attaching layer of nylon surrounding said inner insulating layer, said outer layer being fused and adhering to the nylon coating of said coated glass cloth in said synthetic resin body.

16. A shaped body consisting essentially of a solid epoxy resin body having embedded therein an electric resistance heating arrangement which comprises an open mesh glass cloth; and an insulated electric conductor adhering to one face of said glass cloth in a predetermined pattern, said conductor comprising a metal wire, an inner imperforate and impervious tubular insulating sheath consisting of polytetrafluoroethylene, and an outer attaching layer of fluorinated ethylene-propylene resin and adapted to become actively adhesive at an elevated temperature below the softening point of said polytetrafluoroethylene adhesively adhering to contacting portions of said glass cloth in said epoxy resin body.

(References on following page)

References Cited by the Examiner

UNITED STATES PATENTS

| | | | |
|---|---|---|---|
| 2,423,196 | 7/47 | MacKendrick | 156—173 |
| 2,529,914 | 11/50 | Challenner | 219—528 X |
| 2,548,467 | 4/51 | Crise | 219—541 X |
| 2,566,921 | 9/51 | Briscoe | 219—523 |
| 2,610,286 | 9/52 | Cox | 219—549 X |
| 2,741,692 | 4/56 | Luke | 219—528 |
| 2,743,890 | 5/56 | La Rue | 219—202 X |
| 2,783,358 | 2/57 | Wolf | 219—529 |
| 2,804,533 | 8/57 | Nathanson | 219—522 |
| 2,824,209 | 2/58 | Leopold | 219—495 X |
| 2,846,560 | 8/58 | Jacoby et al. | 219—542 |
| 2,862,097 | 11/58 | Negromanti | 219—499 |
| 2,884,509 | 4/59 | Heath | 219—545 X |
| 2,942,330 | 6/60 | Luke | 29—155.5 |
| 2,952,761 | 9/60 | Smith-Johannsen | 219—541 |
| 2,990,607 | 7/61 | Negromanti | 29—155.5 |
| 3,024,589 | 3/62 | Vaughan. | |

FOREIGN PATENTS

| | | |
|---|---|---|
| 739,444 | 10/55 | Great Britain. |
| 539,292 | 4/57 | Canada. |
| 219,163 | 12/58 | Australia. |
| 1,048,306 | 1/59 | Germany. |

RICHARD M. WOOD, *Primary Examiner.*